(12) United States Patent
Schwaiger et al.

(10) Patent No.: US 7,132,517 B2
(45) Date of Patent: Nov. 7, 2006

(54) WATER-SOLUBLE FIBER-REACTIVE DISAZO DYES, METHOD FOR PRODUCING THE SAME AND THE USE THEREOF

(75) Inventors: Günther Schwaiger, Frankfurt am Main (DE); Werner Russ, Flörsheim-Wicker (DE); Stefan Meier, Frankfurt am Main (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 162 days.

(21) Appl. No.: 10/517,548

(22) PCT Filed: Jun. 10, 2003

(86) PCT No.: PCT/EP03/06027

§ 371 (c)(1), (2), (4) Date: Dec. 8, 2004

(87) PCT Pub. No.: WO03/104335

PCT Pub. Date: Dec. 18, 2003

(65) Prior Publication Data

US 2005/0241079 A1    Nov. 3, 2005

(30) Foreign Application Priority Data

Jun. 11, 2002    (DE) ................ 102 25 859

(51) Int. Cl.
   *C09B 62/515*  (2006.01)
   *C09B 62/477*  (2006.01)
(52) U.S. Cl. .................. 534/625; 534/629; 8/549
(58) Field of Classification Search ........... 534/625, 534/629; 8/549
   See application file for complete search history.

(56) References Cited

U.S. PATENT DOCUMENTS 3,457,251 A * 7/1969 Meininger ............ 534/629
3,457,252 A    7/1969 Meininger
4,649,193 A    3/1987 Meininger et al.
4,939,243 A    7/1990 Meininger et al.
5,274,083 A    12/1993 Herd et al.
5,597,903 A    1/1997 Gisler

FOREIGN PATENT DOCUMENTS

| | | |
|---|---|---|
| DE | 1 544 541 | 4/1970 |
| DE | 1 644 155 | 3/1971 |
| DE | 32 02 120 | 7/1983 |
| DE | 40 39 866 | 6/1991 |
| EP | 0 040 806 | 12/1981 |
| EP | 0 084 849 | 8/1983 |
| EP | 0 085 378 | 8/1983 |
| EP | 0 128 340 | 12/1984 |
| EP | 0 144 704 | 6/1985 |
| EP | 0 203 505 | 12/1986 |
| EP | 0 281 898 | 9/1988 |
| EP | 0 395 951 | 11/1990 |
| EP | 0 668 328 | 8/1995 |
| WO | WO-00/49092 | 8/2000 |

* cited by examiner

*Primary Examiner*—Fiona T. Powers
(74) *Attorney, Agent, or Firm*—Connolly Bove Lodge & Hutz

(57) ABSTRACT

The invention relates to dyes of general formula (1), in which $R1^1$, $R^2$, M, Z, v and x are defined as cited in claim 1, to the production of the same and to the use of said dyes for colouring or printing material containing hydroxy and/or carbonamide groups, preferably fibrous material

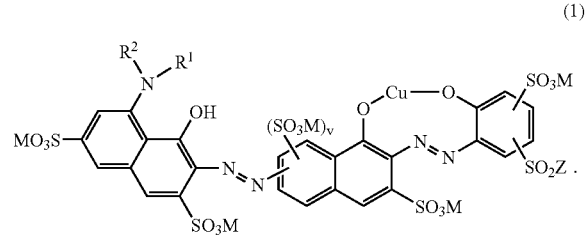

12 Claims, No Drawings

WATER-SOLUBLE FIBER-REACTIVE DISAZO DYES, METHOD FOR PRODUCING THE SAME AND THE USE THEREOF

RELATED APPLICATIONS

This application is a national stage application (under 35 U.S.C. 371) of PCT/EP03/06027 filed Jun. 10, 2003 which claims benefit to German application Ser. No. 102 25 859.7 filed Jun. 11,2002.

This invention relates to the field of fiber-reactive copper complex disazo dyes.

Copper complexes of fiber-reactive disazo compounds containing one or more fiber-reactive groups are known for example from DE-B-1 544 541, DE-B-1 644 155, EP 668 328, DE 32 02 120, EP 085 378, EP 040 806, EP 085 378, EP 203 505, DE 3941620, DE 4039866, EP 281898, EP 395951. However, they have certain application defects, for example an excessive dependence of the color yield on varying parameters in the dyeing process, or an inadequate or unlevel color build-up on cotton, good color build-up resulting from the ability of a dye to provide a stronger dyeing when used in a higher dye concentration in the dyebath. Moreover, these dyes exhibit unsatisfactory fixation yields, i.e., the portion of dye permanently fixed to the material to be dyed is too low, especially at low temperatures, and also unsatisfactory wash- and lightfastnesses.

However, it is important, for ecological and economic reasons, to provide dyes having particularly high fixation yields in order that the portion of unfixed dye in the dyehouse effluent may be minimized. Moreover, dyes should always provide uniformly strong dyeings, ideally regardless of changing dyeing parameters, for example the dyeing temperature in the dyeing process. Furthermore, washfastness requirements are more stringent these days.

The present invention now provides dyes of the general formula (1) which surprisingly afford distinctly superior washfastnesses and lightfastnesses coupled with very good build-up. Moreover, these dyes have higher fixation yields and a distinctly lower parameter dependence in dyeing. They are therefore also more compatible with other dyes which fix at distinctly lower temperatures.

The invention accordingly provides dyes of the general formula (1):

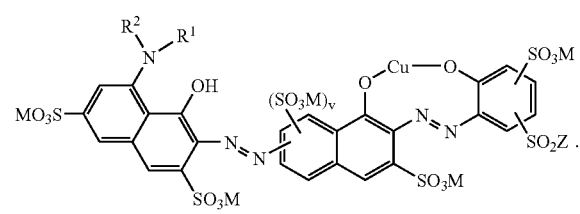

(1)

where
M is hydrogen, alkali, ammonium or the equivalent of an alkaline earth metal ion,
v is 0 or 1 and
Z is —CH=CH$_2$ or —CH$_2$CH$_2$Z$^1$,
  where
  Z$^1$ is hydroxyl or an alkali-detachable group, and
R$^1$ is hydrogen or C$_1$–C$_4$-alkyl;

R$^2$ is a moiety of the general formulae (2), (3), (4) or (5)

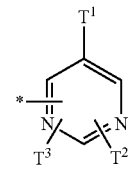

(2)

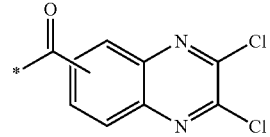

(3)

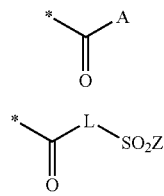

(4)

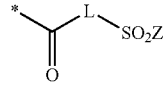

(5)

where
  T$^1$ is hydrogen, methyl, fluorine or chlorine,
  T$^2$ is hydrogen, fluorine or chlorine with the proviso that T$^2$ and T$^1$ are not both hydrogen;
  T$^3$ is hydrogen, fluorine or chlorine;
  A is C$_1$ to C$_4$-alkyl which may be substituted by up to two substituents selected from the group consisting of chloro, bromo, hydroxyl and carboxyl, C$_2$ to C$_4$ alkenyl which may be substituted by up to two substituents from the group consisting of chloro, bromo and hydroxyl, or phenyl,
  L is phenylene or naphthalene, which may be substituted by up to two substituents selected from the group consisting of chloro, bromo, hydroxyl, C$_1$ to C$_4$-alkyl especially methyl, ethyl, sulfo and cyano, or else a C$_2$ to C$_6$ alkylene;
  Z is —CH=CH$_2$, —CH$_2$CH$_2$Z$^1$,
    where
    Z$^1$ is hydroxyl or an alkali-detachable group.

(C$_1$–C$_4$)-Alkyl groups A and R$^1$ can be straight-chain or branched and is in particular selected from the group consisting of methyl, ethyl, n-propyl, i-propyl, n-butyl, i-butyl, sec-butyl and tert-butyl. Preference is given to methyl and ethyl. Substituted C$_1$ to C$_4$ alkyl groups A are in particular carboxyethyl, carboxypropyl, 1,2-dibromoethyl or chloromethyl. Substituted alkyl radicals A are preferably 2-bromoethenyl or 2-chloroethenyl.

Examples of preferred R$^2$ radicals of the general formula (2) are: 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl, 4,5-difluoropyrimidin-6-yl, 5-chloro-4-fluoropyrimidin-6-yl, 2,4,5-trichloropyrimidin-6-yl, 4,5-dichloropyrimidin-6-yl, 2,4-dichloropyrimidin-6-yl, 4-fluoropyrimidin-6-yl, 4-chloropyrimidin-6-yl. Particular preference is given to R$^2$ being 2,4-difluoropyrimidin-6-yl or 5-chloro-2,4-difluoropyrimidin-6-yl.

An example of a preferred R$^2$ radical of the general formula (3) is 2,3-dichloroquinoxaline-6-carbonyl.

Examples of preferred R$^2$ radicals of the general formula (4) are acetyl, n-propionyl and n-butyryl; particular preference is given to R$^2$ being acetyl.

Examples of preferred R² radicals of the general formula (5) are 3-chloroethylsulfonylbenzoyl and 2-chloroethylsulfonylpropionyl.

In the foregoing general formulae and also in the subsequent general formulae, the individual symbols, whether they bear identical or different designations within any one general formula, can have meanings under their definition which are mutually identical or different.

The dyes of the general formula (1) can possess different fiber-reactive groups —SO₂Z within the meaning of Z. Examples of alkali-eliminable substituents $Z^1$ in the β-position of the ethyl group of Y or Y' are halogen atoms, such as chlorine and bromine, ester groups of organic carboxylic and sulfonic acids, such as alkylcarboxylic acids, optionally substituted benzenecarboxylic acids and optionally substituted benzenesulfonic acids, such as the groups alkanoyloxy of 2 to 5 carbon atoms, of which in particular acetyloxy, benzoyloxy, sulfobenzoyloxy, phenylsulfonyloxy and tolylsulfonyloxy, further acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms each, such as dimethylamino and diethylamino.

More particularly, the fiber-reactive groups —SO₂Z can be first vinylsulfonyl groups and secondly groups —CH₂CH₂Z¹, preferably β-thiosulfatoethyl and especially β-sulfatoethylsulfonyl groups.

The groups sulfo, carboxyl, include not only their acid form but also their salt form. Accordingly, sulfo groups are groups conforming to the general formula —SO₃M, carboxyl groups are groups conforming to the general formula —COOM, in each of which M is as defined above.

Preference among the diazo compounds of the general formula (1) is given to those which conform to the general formula (1a)

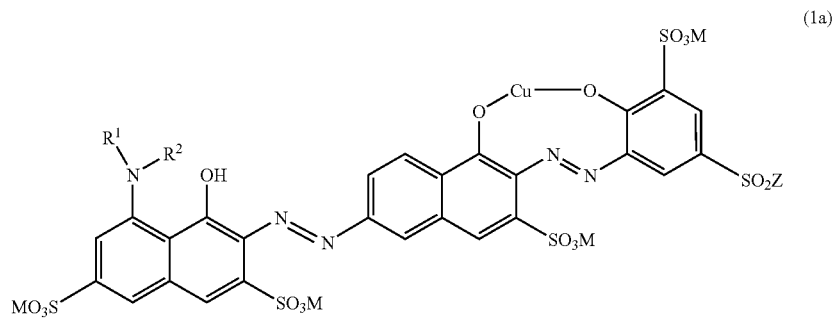

where M, R¹ and R² are each as defined above.

The dyes of the general formula (1) according to the invention are preparable for example by diazotization of a substituted aromatic amine of the general formula (6)

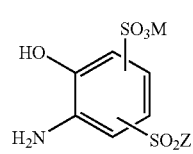

and coupling onto a substituted aminonaphthol of the general formula (7)

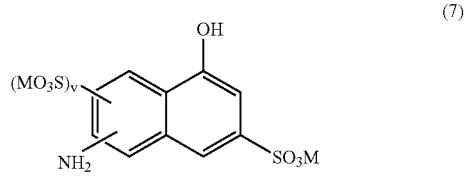

and subsequent diazotization of the resulting aminomonoazo dye of the general formula (8)

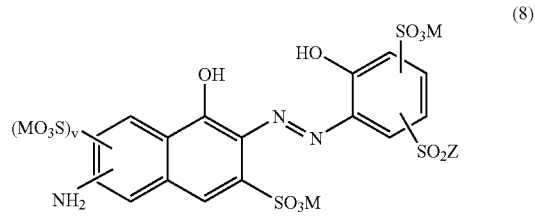

and coupling at a pH of 6 to 9, where appropriate in the presence of a dispersant, onto the terminal coupling component of the general formula (9)

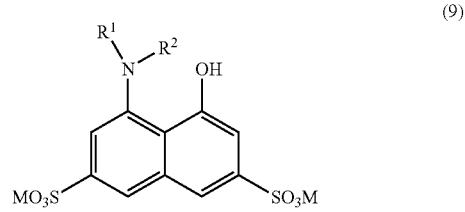

followed by a subsequent coppering reaction with copper sulfate pentahydrate.

Diazotizable amines having complexing radicals of the general formula (6) are for example 3-amino-4-hydroxy-5-sulfophenyl β-sulfatoethyl sulfone or 3-amino-4-hydroxy-5-sulfophenyl vinyl sulfone.

Compounds of the general formula (7) are for example 2-amino-5-hydroxynaphthalene-7-sulfonic acid, 2-amino-8-hydroxynaphthalene-6-sulfonic acid, 2-amino-5-hydroxynaphthalene-1,7-disulfonic acid and 2-amino-8-hydroxynaphthalene-3,6-disulfonic acid.

Compounds of the general formula (8) and (9) are for example known from EP 0 085 378, EP 0 084 849 and can be prepared by common methods.

The separation and isolation, from the aqueous synthesis solutions, of the compounds of the general formula (1) according to the invention can be effected according to generally known methods for water-soluble compounds, for example by precipitating from the reaction medium by means of an electrolyte, such as sodium chloride or potassium chloride for example, or by evaporating the reaction solution itself, for example by spray drying. In the latter case, it is frequently advisable first to precipitate any sulfate in the solutions as calcium sulfate and remove it by filtration.

The dyes of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogen-phosphate, or small amounts of siccatives; if they are present in a liquid, aqueous solution (including the presence of thickeners of the type customary in print pastes), they may also include substances which ensure a long life for these preparations, for example mold preventatives.

In general, the dyes of the invention are present as dye powders containing 10 to 80% by weight, based on the dye powder or the preparation, of an electrolyte salt which is also referred to as a standardizing agent. These dye powders may additionally include the aforementioned buffer substances in a total amount of up to 10% by weight, based on the dye powder. If the dyes of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight, preferably up to 2% by weight.

The dyes of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the as-synthesized solutions of the dyes of the invention, if appropriate after addition of a buffer substance and if appropriate after concentrating or diluting, can be used directly as liquid preparation for dyeing.

The present invention thus also relates to the use of the dyes of the invention for dyeing or printing these materials and to processes for dyeing or printing these materials in a conventional manner, by using dyes of the invention as a colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dyes of the invention can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good wash-fastnesses. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C., it is also possible to use superheated steam and high-pressure steam at temperatures of up to 160° C.

The acid-binding agents which effect the fixation of the dyes of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The cellulose dyeings obtained following the customary aftertreatment by rinsing to remove unfixed dye portions exhibit very good dye properties and provide by the application and fixing methods customary in the art for fiber-reactive dyes strong dark blue dyeings and prints having very good fastness properties, especially very good wash-, light-, alkali-, acid-, water-, seawater-, perspiration- and rubfastnesses, on the materials mentioned in the description, such as cellulose fiber materials, especially cotton and viscose. The dyeings are further notable for their high degree of fixation and good build-up on cellulose materials. Of particular advantage is the good washfastness of the dyeings, the high fixation value and the low temperature dependence compared with the prior art.

Furthermore, the dyes of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dyes of the invention are preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dyes of the invention is very good, they can also be used with advantage in customary continuous dyeing processes. The dyes of the invention dye the materials mentioned in deep blue shades.

The examples hereinbelow serve to illustrate the invention. Parts and percentages are by weight, unless otherwise stated. The compounds described in the examples in terms of a formula are partly indicated in the form of free acids; in general these compounds are prepared and isolated in the form of their salts, preferably sodium or potassium salts, and used for dyeing in the form of their salts. The starting compounds mentioned in the following examples, especially table examples, can similarly be used in the synthesis in the form of the free acid or in the form of their salts, preferably alkali metal salts, such as sodium or potassium salts.

EXAMPLE 1

377 parts of 4-β-sulfatoethylsulfonyl-2-aminophenol-6-sulfonic acid are diazotized with sodium nitrite and coupled at pH 6-7 onto 239 parts of 2-amino-5-hydroxynaphthalene-7-sulfonic acid. This monoazo compound

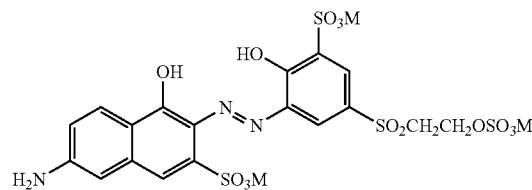

is diazotized and coupled onto 361 parts of N-acetamino-3,6-disulfo-8-hydroxynaphthalene

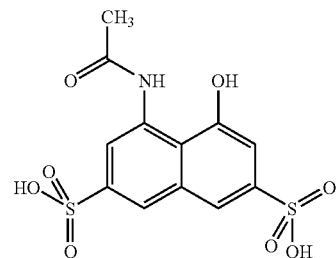

The resultant bisazo dye

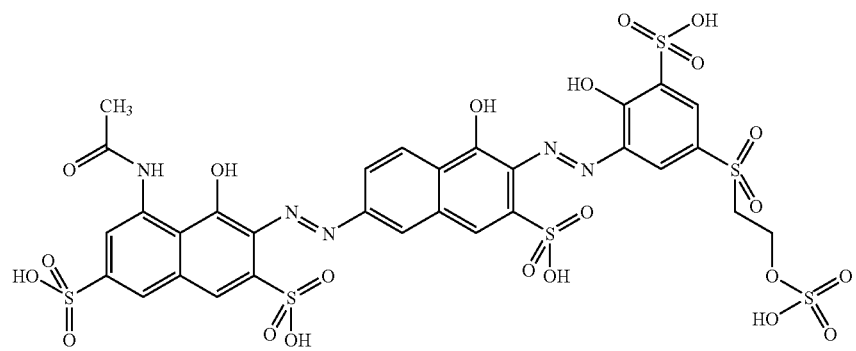

is subsequently metallized with 245 parts of copper sulfate pentahydrate. The blue dye obtained, which conforms to the formula A

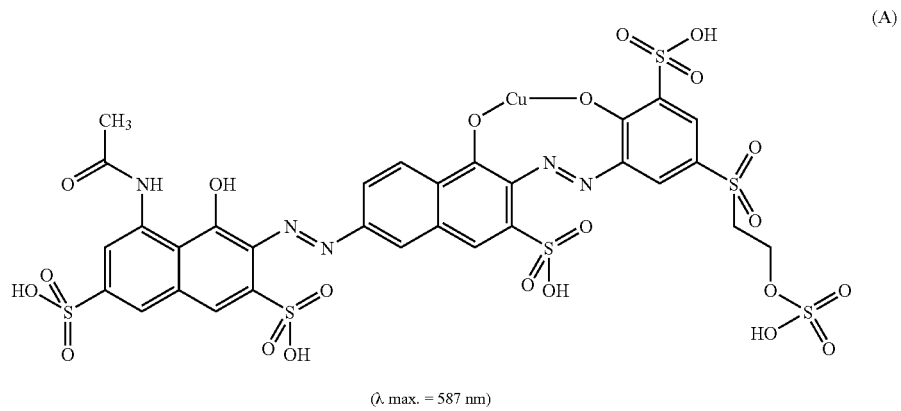

(λ max. = 587 nm)

is salted out with sodium chloride, filtered off and dried at 50° C. under reduced pressure. The dye produces strong dark blue dyeings and prints on cotton which have very good fastnesses, among which the light-, wash-, water- and perspirationfastnesses and also the fastness to chlorinated water, solvents, crocking and hot pressing may be singled out in particular.

The table examples which follow describe further dyes of the general formula (1-A) according to the invention. The dyes, when applied by the dyeing methods customary for reactive dyes, provide deep blue dyeings having good all-round fastnesses on cotton for example.

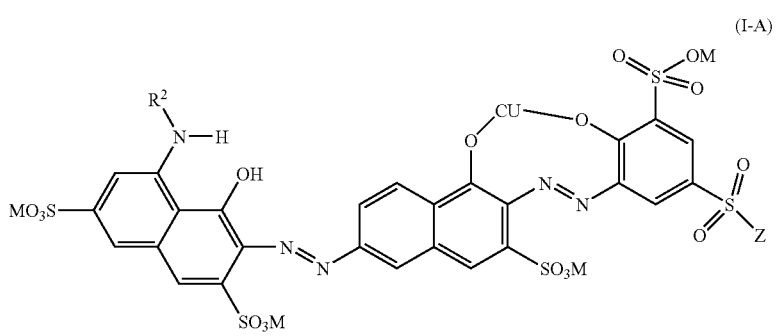

| Example | R² | Z |
|---|---|---|
| 2 | —H | —CH₂CH₂—OSO₃M |
| 3 | *−C(=O)−phenyl | " |
| 4 | 2,6-difluoropyrimidin-4-yl | " |

-continued
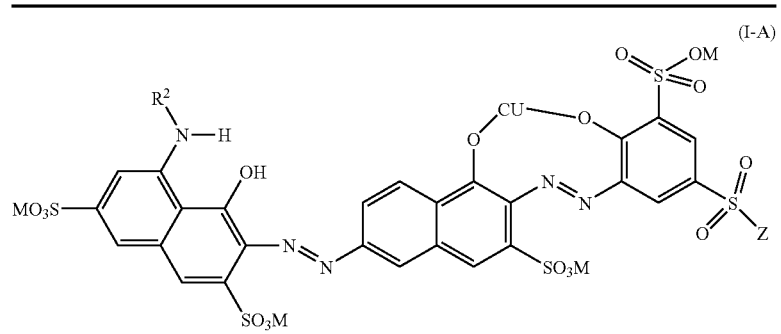
(I-A)
| Example | R² | Z |
|---|---|---|
| 5 | 2,5-dichloro-4,6-difluoropyrimidin-*-yl | " |
| 6 | 2,4,5-trichloropyrimidin-6-yl (via *) | " |
| 7 | *-C(O)CH₂CH₂C(O)OH | " |
| 8 | *-C(O)-(2,6-dichloropyrimidin-4-yl) | " |
| 9 | *-C(O)-(2,3-dichloroquinoxalin-6-yl) | —CH₂CH₂—OSO₃M |
| 10 | *-C(O)-[3-(SO₂CH₂CH₂Cl)phenyl] | " |
| 11 | *-C(O)CH₂CH₂SO₂CH₂CH₂Cl | " |

-continued

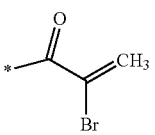

(I-A)

| Example | R² | Z |
|---------|-----|---|
| 12 | 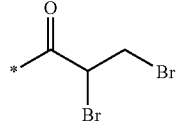 | " |
| 13 | 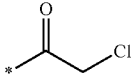 | " |
| 14 | 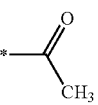 | " |

The process described in example 1 likewise provides the hereinbelow mentioned compounds of the general formula (I-B). When applied by the dyeing methods customary for reactive dyes, they provide yellowish to brownish red dyeings having good all-round fastnesses on cotton for example.

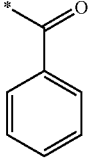

(I-B)

| Example | R² | Z |
|---------|-----|---|
| 16 | *—C(=O)—CH₃ | —CH=CH₂ |
| 17 | *—C(=O)—C₆H₅ | —CH₂CH₂—OSO₃H |

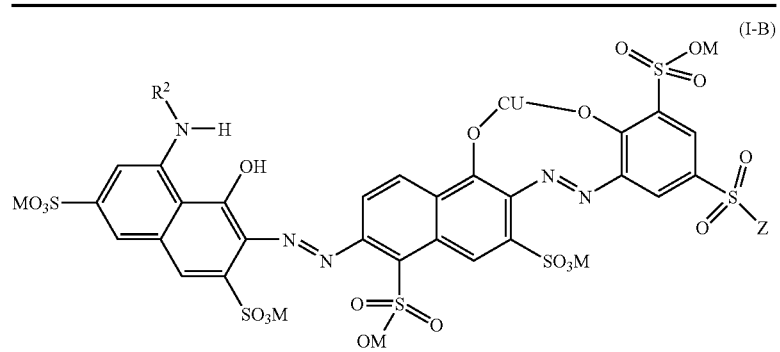

| Example | R² | Z |
|---|---|---|
| 18 | 2,6-difluoropyrimidin-4-yl | " |
| 19 | 5-chloro-2,6-difluoropyrimidin-4-yl | —CH₂CH₂—SSO₃H |
| 20 | *—C(O)CH₂CH₂CH₂—S(O)₂—CH=CH₂ | —CH=CH₂ |

40

The process described in example 1 likewise provides the hereinbelow mentioned compounds of the general formula (I-C). When applied by the dyeing methods customary for reactive dyes, they provide yellowish to brownish red dyeings having good all-round fastnesses on cotton for example.

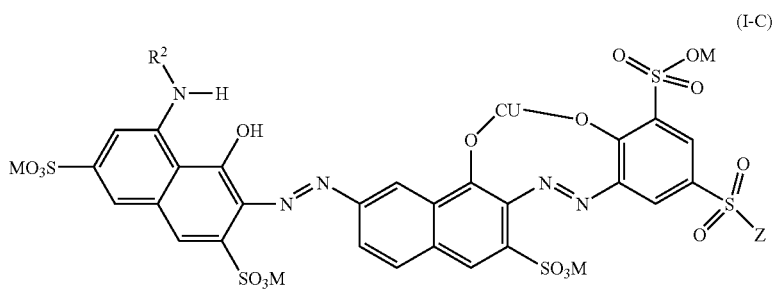

| Example | R² | Z |
|---|---|---|
| 21 | *—C(O)CH₃ | —CH₂CH₂—OSO₃H |

-continued

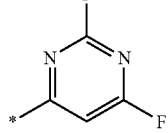

| Example | R² | Z |
|---|---|---|
| 22 | 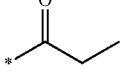 | " |
| 23 | 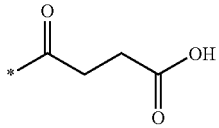 | " |
| 24 | 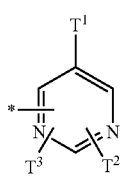 | " |

What is claimed is:

1. Dyes of the general formula (1):

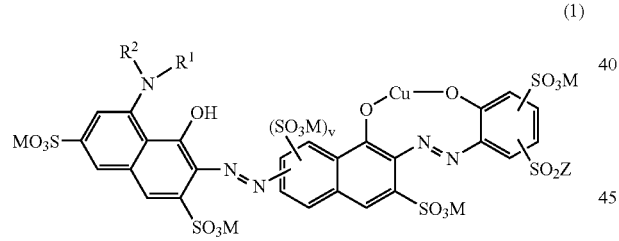

where
- M is hydrogen, alkali, ammonium or the equivalent of an alkaline earth metal ion,
- v is 0 or 1 and
- Z is —CH=CH₂ or —CH₂CH₂Z¹,
  where
  - Z¹ is hydroxyl or an alkali-detachable group, and
- R¹ is hydrogen or $C_1$–$C_4$-alkyl;
- R² is a moiety of the general formulae (2), (3), (4) or (5)

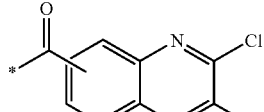

-continued

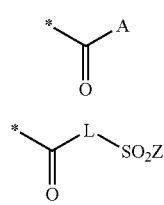

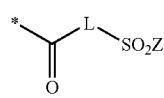

where
- $T^1$ is hydrogen, methyl, fluorine or chlorine,
- $T^2$ is hydrogen, fluorine or chlorine with the proviso that $T^2$ and $T^1$ are not both hydrogen;
- $T^3$ is hydrogen, fluorine or chlorine;
- A is $C_1$ to $C_4$-alkyl which may be substituted by up to two substituents selected from the group consisting of chloro, bromo, hydroxyl and carboxyl, $C_2$ to $C_4$ alkenyl which may be substituted by up to two substituents from the group consisting of chloro, bromo and hydroxyl, or phenyl,
- L is phenylene or naphthalene, which may be substituted by up to two substituents selected from the group consisting of chloro, bromo, hydroxyl, $C_1$ to $C_4$-alkyl especially methyl, ethyl, sulfo and cyano, or else is a $C_2$ to $C_6$ alkylene;

Z is —CH=CH$_2$, —CH$_2$CH$_2$Z$^1$,

Where

Z$^1$ is hydroxyl or an alkali-detachable group.

2. Dyes as claimed in claim 1 wherein R$^2$ is a moiety of the general formula (4).

3. Dyes as claimed in claim 1 wherein v is 0.

4. Dyes as claimed in claim 1 wherein the SO$_2$Z group is meta to the azo group.

5. Dyes as claimed in claim 1, wherein R$^2$ is a CH$_3$CO— radical.

6. The process for preparing compounds as claimed in claim 1 by diazotization of a substituted aromatic amine of the general formula (6)

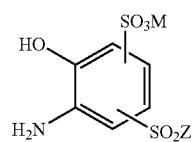

(6)

and coupling onto the substituted aminonaphthol of the general formula (7)

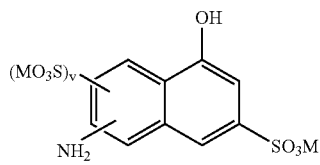

(7)

and subsequent diazotization of the resulting aminomonoazo dye of the general formula (8)

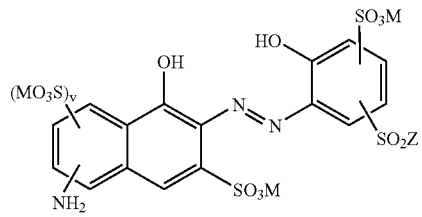

(8)

and coupling at a pH of 6 to 9, onto the terminal coupling component of the general formula (9)

(9)

followed by a subsequent coppering reaction with copper sulfate pentahydrate.

7. A process for dyeing or printing hydroxyl- and/or carboxamido-containing material applying one or more dyes as claimed in claim 1 in dissolved form to the material and fixing the dye or dyes on the material by means of heat or with the aid of an alkaline agent or by means of both heat and with the aid of an alkaline agent.

8. A dye preparation comprising a dye as claimed in claim 1.

9. Dyes as claimed in claim 2, wherein v is 0.

10. Dyes as claimed in claim 9, wherein the SO$_2$Z group is meta to the azo group.

11. Dyes as claimed in claim 10, wherein R$^2$ is a CH$_3$CO— radical.

12. The process as claimed in claim 7, wherein the material is a fiber material.

\* \* \* \* \*